Jan. 26, 1954  M. R. FENSKE ET AL  2,667,407
LIQUID-LIQUID CONTACT METHOD AND APPARATUS
Filed Feb. 11, 1949  7 Sheets-Sheet 1

Merrell R. Fenske
Robert B. Long  Inventors

By W. V. Heilman  Attorney

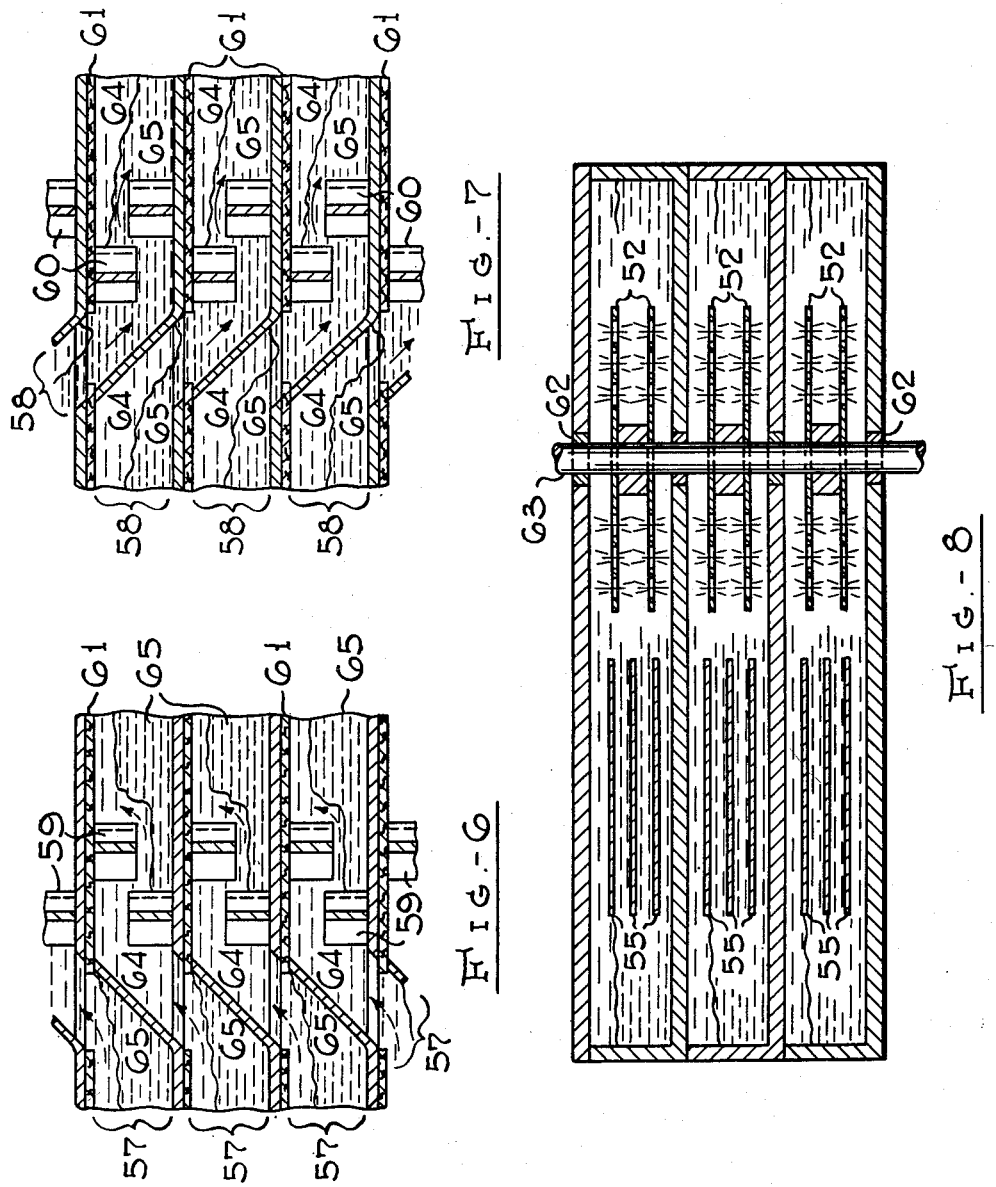

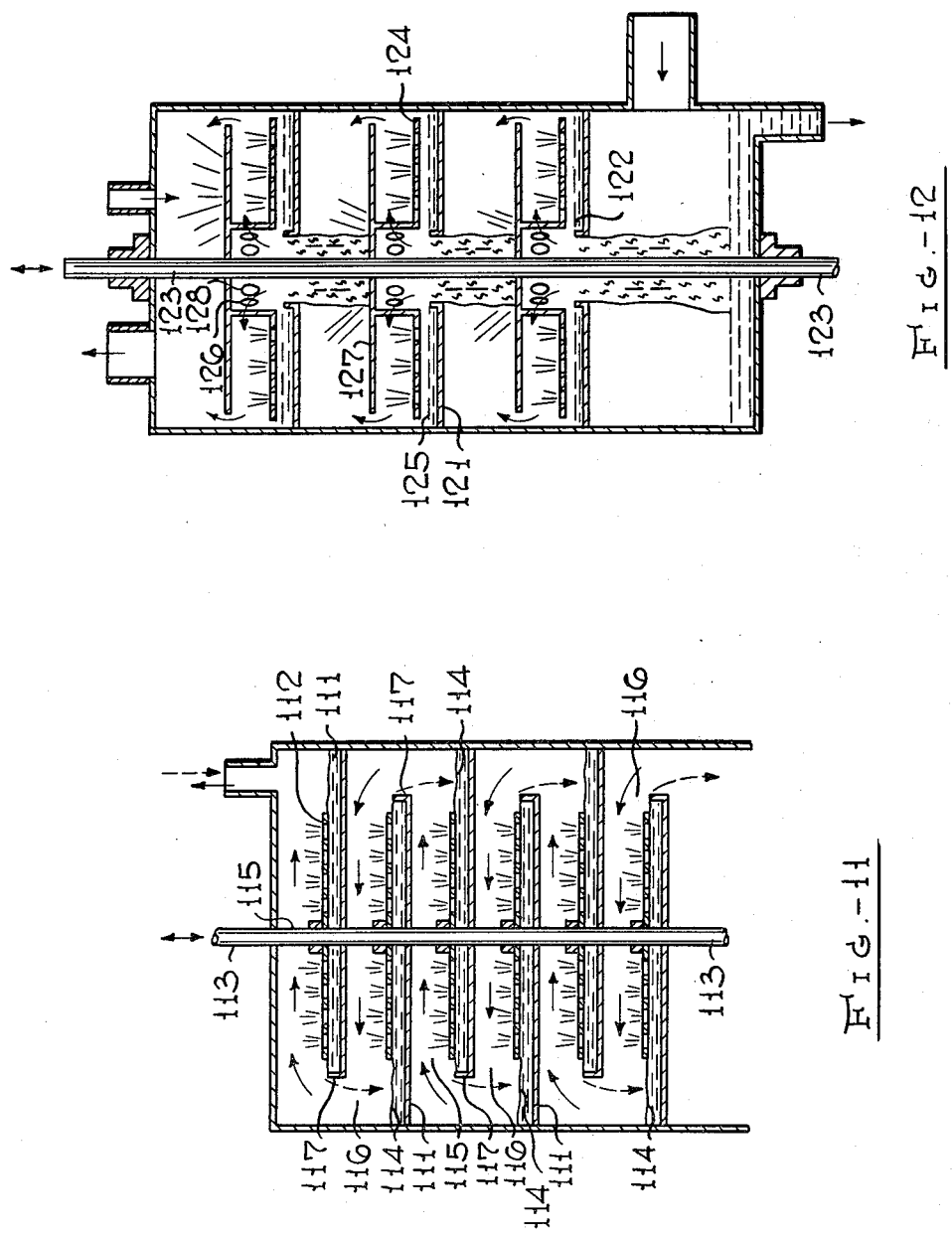

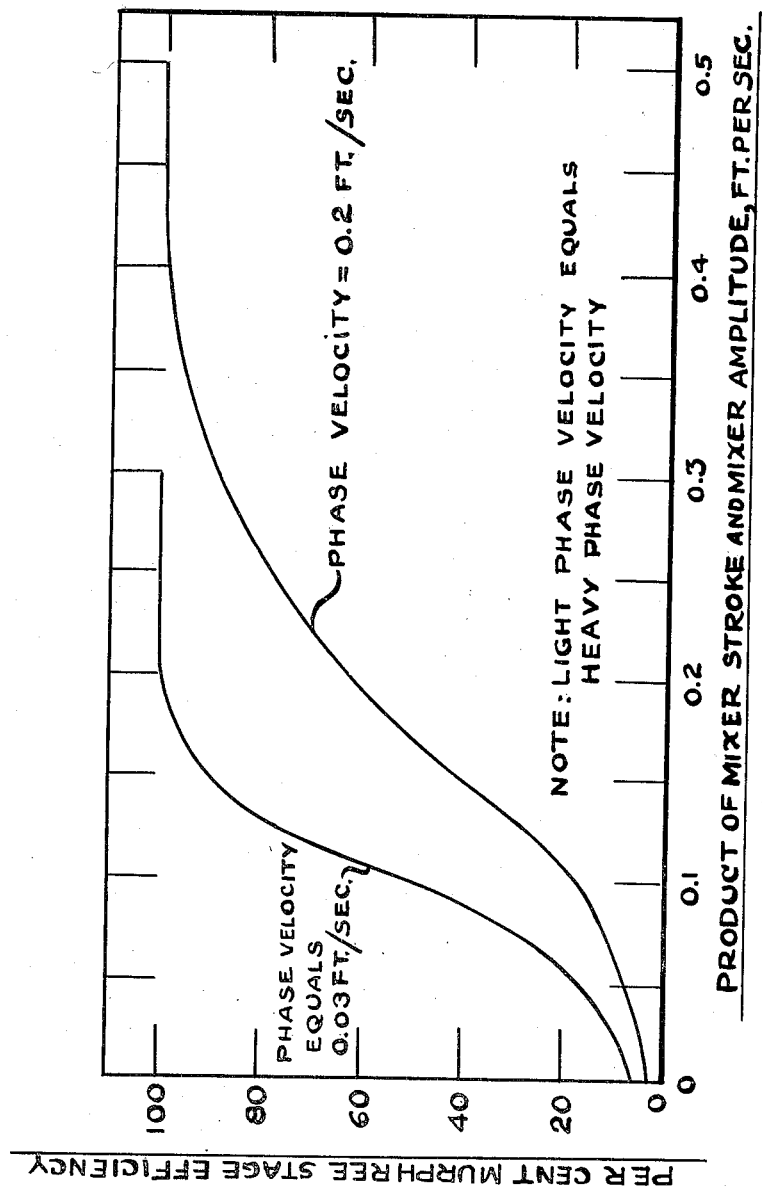

Jan. 26, 1954 M. R. FENSKE ET AL 2,667,407
LIQUID-LIQUID CONTACT METHOD AND APPARATUS
Filed Feb. 11, 1949 7 Sheets-Sheet 7
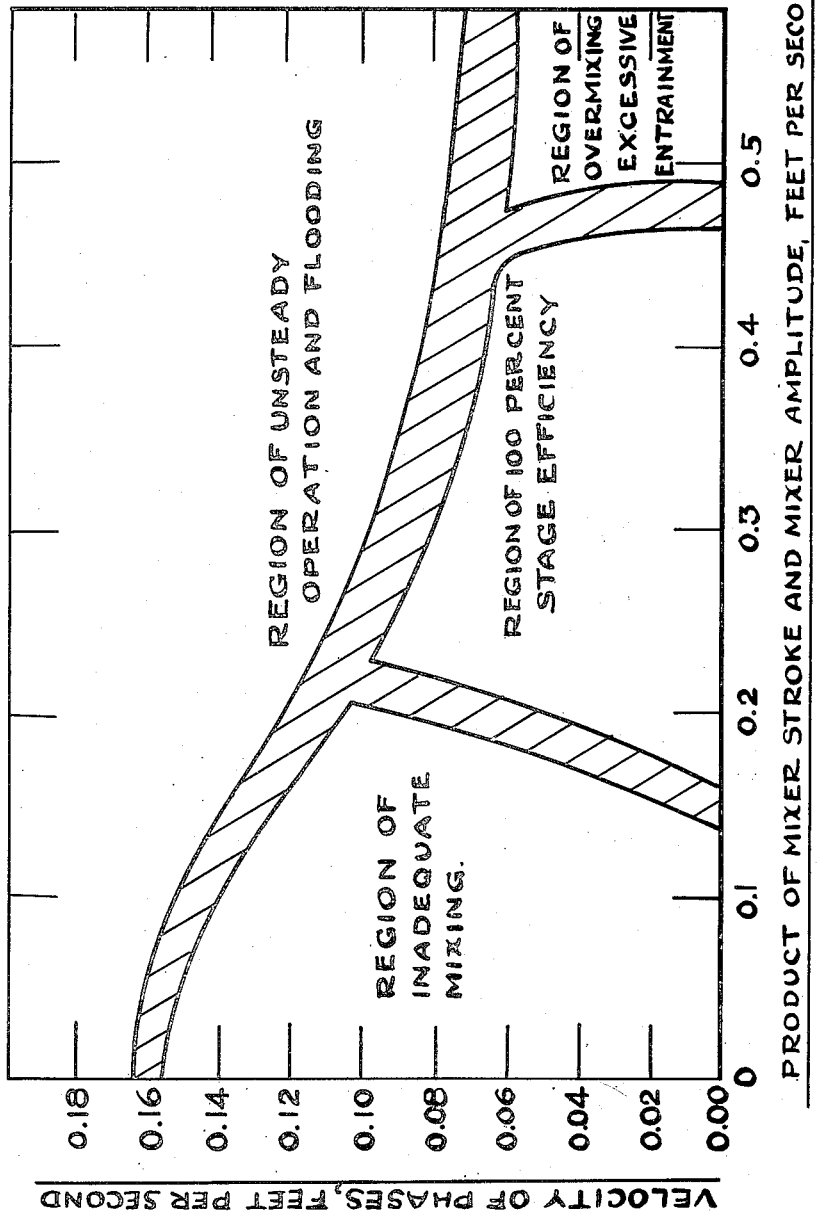

Patented Jan. 26, 1954

2,667,407

UNITED STATES PATENT OFFICE 2,667,407

LIQUID-LIQUID CONTACT METHOD AND APPARATUS

Merrell R. Fenske and Robert B. Long, State College, Pa., assignors to Standard Oil Development Company, a corporation of Delaware Application February 11, 1949, Serial No. 75,904

11 Claims. (Cl. 23—310)

This invention relates to a process and apparatus for bringing into intimate contact at least two immiscible or partially miscible fluid phases for the purpose of obtaining the transfer of material from at least one phase to another. The fluids may comprise liquids, gases, mixtures of gases, mixtures of liquids, suspensions, or emulsions. The invention in particular may be applied when treating one liquid phase with at least one other liquid phase as in washing or extracting processes and when treating a gas phase with at least one liquid phase as in distillation, scrubbing, absorption, stripping, evaporation, and humidification processes.

It is an object of this invention to provide an improved process and apparatus for contacting two immiscible or partially miscible fluids, using flow of the phases through a contact zone which is provided with means for preventing or reducing channeling, and for bringing the fluids into more intimate contact than has been possible with processes and apparatus used heretofore. It is a further object of this invention to provide a process for contacting fluids in a manner to insure a rapid attainment of equilibrium between the fluids and also the rapid separation of the resulting phases after the attainment of equilibrium. It is a still further object of this invention to provide a process and apparatus for bringing into intimate contact at least two immiscible or partially miscible fluid phases having increased effectiveness, high capacity, low pressure drop, low power requirements, and great flexibility with respect to the flow rates and the physical properties of the fluid phases. Other objects of this invention will be apparent from a reading of the specification.

It has been proposed to contact liquids, or a liquid and a gas, in a countercurrent manner by introducing them at vertically spaced points of a column or tower and withdrawing the products at other vertically spaced points. With a view of obtaining a better contact between the fluids it has further been proposed to provide the tower with contact means such as Raschig rings, packing, etc. The disadvantage of most such installations however, is that one of the fluids flows upwardly in small streams in certain parts of the tower, and the other fluid flows downwardly in similar streams, but in other parts of the tower, thereby preventing effective contact between them. It has also been proposed to contact the fluids by means of fixed plates provided with orifice-like perforations through which the fluids flow. However, the use of such means requires the expenditure of relatively large amounts of power for pumping the phases and also allows very little variation in flow rate from that for which the columns were originally designed.

Such perforated plates have for their object the production of small droplets or streams of the fluids to be contacted by extruding the fluids through small holes and thus producing sized droplets of one phase which are then free to rise or fall through the bulk of the other phase. In general, the light phase is fed to the underside of the sieve or screen plate where it builds up a layer until the depth of this layer is sufficient to force the light phase through the holes in the sieve or screen plate. Thus, the effective utilization of these plates depends on the maintenance of a light phase layer under the plate and a heavy phase layer above the plate. Consequently, a liquid seal between the edges of the plate and the walls of the containing vessel or some equivalent method of maintaining a light phase layer under the plate is required.

In order to overcome some of the disadvantages of the fixed perforated plates, it has been proposed to oscillate the perforated plates to aid in the flow and extrusion of the droplets through the plate. However, in such cases the light phase layer under the plate and the heavy phase layer above the plate are still required as well as the liquid seal around the plate.

It has now been found that the above disadvantages can be avoided and more intimate contact can be obtained by flowing the fluids through a vessel provided with vertically vibrating, reciprocating or oscillating perforated plates immersed in a liquid and so arranged that the phases are maintained in the region of activity of the perforated plates for a sufficient length of time to cause the desired intimate contact.

In contrast to the sieve and screen-plate units mentioned above, the operation of the present invention is not jeopardized when the perforated plate is completely immersed in one phase with the two-phase interface a sufficient distance from the plate so that the perforated plate never breaks through the interface during its oscillation.

Furthermore, not only does the present invention avoid the use of liquid seals between the edges of the perforated plates and the walls of the containing vessel but also it does not require that the space between the perforated plates and the walls of the container be small.

Since the energy of mixing is provided by the oscillating plate, the resistance to flow or pressure drop through the zone in which the perforated plate is acting is much less than the pressure drop through the usual fixed orifice plate.

By imparting a reciprocating motion to a plate containing a multiplicity of orifice-like holes spaced throughout the plate and by immersing the reciprocating perforated plate in a liquid, a multiplicity of jets or streams will flow out of each hole on both sides of the plates. On the downstroke the liquid under the plate is displaced or sheared away by the solid area of the plate and must flow either through the holes in the form of jets or around the periphery of the perforated plate. On the up-stroke the liquid above the plate is now displaced by the solid area of the plate and must flow either through the holes in the form of jets or around the periphery of the plate. The volume of liquid flowing through the perforations and around the periphery of the perforated plate per unit time is equal to the product of the volume sheared out by the plate on each single stroke and the number of strokes per unit time. Half of this volume flows during the down-strokes and the other half during the up-strokes. Thus the total volume displaced per unit time is twice the product of the solid area of the perforated plate and the frequency and amplitude of the vibrating, reciprocating, or oscillating motion. For most satisfactory operation, the volume thus displaced per unit time should be from about 10 to 50 times the total volume of the phases being treated in the mixing zone per unit time. At oscillation frequencies in excess of about 200 cycles per minute the individual jets or streams for each stroke are not distinguishable and the liquid appears to be flowing in continuous streams out of each hole both above and below the oscillating plate, thus providing the major part of the agitation of the phases at the expense of the kinetic energy of the jets. The relative quantities of the liquid displaced by the solid area of the plate which go through the orifice-like holes or around the periphery of the plate depend upon the relative resistances to flow of the two flow paths. Thus, the greater the resistance to flow through the holes, the larger the fraction of the displaced liquid which flows around the periphery of the plate. Conversely, the greater the resistance to flow around the periphery of the plate, the larger the fraction of the displaced liquid which flows through the orifice-like holes.

From the above description, it can be seen that the velocities of the streams or jets issuing from the holes and the distances that the streams or jets flow before they lose their kinetic energy depend upon the product of the frequency and amplitude of the oscillating motion of the plate, upon the ratio of the solid area around each hole to the hole area, upon the total resistance to flow offered by the hole and upon the total resistance to flow around the periphery of the plate. The distance that the streams or jets travel before they lose their kinetic energy is very important, because the relative independence of the degree of mixing for this type of mixer from the position of the interface depends upon the jets of one phase maintaining sufficient kinetic energy to break through the interface and agitate the other phase. This distance of travel of the jets should be at least 3 or 4 times the diameter of the holes from which the jets issue.

When an oscillating perforated plate is placed at or near a gas-liquid interface, jets of liquid are thrown into the gas space. If the perforated plate is placed right at the interface there is much spraying of liquid jets through the holes into the gas phase, but not much gas is driven into the bulk of the liquid. However, if the perforated plate is positioned just under the surface of the liquid, the liquid jet which has been thrown into the gas space whips some of the gas into the liquid as it falls back into the body of the liquid to form a liquid-gas mixture just above the plate. The oscillating perforated plate then pumps the liquid-gas mixture from above the plate through the holes deep down into the main body of the liquid.

From the above considerations, it can be seen that:

1. If the holes are too small or if the perforated plate is too thick, the resistance to flow offered by the holes is increased and the velocities of the streams are decreased.

2. If a thick perforated plate must be used for strength, the holes should have the form of sharp edged orifices. The nearer these sharp edged orifices approach to the shape of a hole in a thin plate, the greater will be the velocity of the stream through the orifice.

3. If the holes are placed very close together as in a screen, or are very large with respect to the solid area between them there will be insufficient solid area per unit of hole area to displace liquid and the streams or jets issuing from the holes will have very low velocities and very low penetration distances.

4. If the holes are spaced very far apart or the area between holes is very large with respect to the area of the hole, the streams or jets will have high velocities and penetrating power but there will be a much smaller percentage of the displaced liquid flowing through the holes. This is due to the high flow resistance accompanying the high velocities through the holes, the correspondingly greater tendency for the liquid to flow around the periphery of the plate, and the smaller number of holes per unit area.

5. The shape of the perforation has some effect on the type of stream coming through the holes, but the effect of cross-sectional area of the perforation is generally more important to degree of mixing than the shape of the hole. Thus, the holes may be round or slot-like, tapered or conical, or in the form of nozzles. Conical holes and nozzles produce very much stronger jets from the side of the hole with the smaller diameter than from the side with the larger diameter. This allows the construction of perforated plates which produce strong jets on only one side. These directional plates can be used in pairs to provide isolated regions of violent agitation between the plates with the phases outside the plates remaining relatively quiescent. The holes may be placed on the sides of dome-like structures on the plates whereby angular effects are obtained. If the holes are placed opposite one another in the domes the jets on the upstroke will impinge one on the other to give a substantially vertical stream below the plate. Baffles may also be used to give angularity to the jets.

6. The holes farthest from the edge of the perforated plate produce stronger streams than those near the edge because of the decreased tendency for the liquid to flow around the periphery of the plate when it has a longer distance to travel to reach the periphery of the plate. By placing wide bands or collars around the periphery of the plates at right angles to the plane of the plate, the resistance to flow around the periphery is increased for the holes near the periphery of the plate. Under these conditions the distribution of mixing over the plate is much better.

7. As the size of the perforated plate is decreased, the resistance to flow around the periphery of the plate is decreased thus allowing a larger percentage of the displaced liquid to flow around the periphery of the plate. This means higher frequencies and amplitudes are necessary to produce a given velocity through the holes. This corresponds to shearing out a larger volume of liquid per unit time by means of the plate in order to produce the given velocity through the holes.

For practical agitating purposes it has been found that the frequency of the reciprocating motion may be from about 200 to 3000 cycles per minute, the hole diameters for round holes may be from about ¼-inch to about 2 inches, for holes of other shape an equivalent hole area may be used, the amplitude of stroke may be from $\frac{1}{16}$-inch to about 2 inches, and the ratio of hole area to solid area may be from about 0.05 to 1 (5 to 50% open area). The proper choice of these variables allows the penetration distances of the streams to be varied from less than 1 inch to more than 1 foot.

While the above ranges of operating variables are allowable, there are some practical limitations on how the variables may be combined. For example, the product of the frequency in cycles per minute and the amplitude in inches may vary from about 50 inches per minute to 1000 inches per minute. This range is considerably less than the range indicated by the extremes calculable from the above frequency and amplitude data. The product of frequency and amplitude determines the degree of mixing over wide ranges of frequency and amplitude. However, it has been found that there is a lower limit on the frequencies which can satisfactorily be used. At frequencies below about 100 cycles per minute the mixing action of reciprocating perforated plates is usually unsatisfactory even at large amplitudes of stroke.

In the case of round holes, the optimum hole diameter for the holes in the perforated plates is usually from about 1.5 to 6 times the amplitude of the reciprocating motion. In the case of other shapes of holes the equivalent area is frequently a good criterion.

Certain preferred details of construction together with additional objects and advantages will be apparent. The invention itself will be best understood by reference to the accompanying drawings wherein:

Figure 1 illustrates a form of the invention in which a countercurrent extraction tower is provided with a plurality of stages, each stage being provided with a vibrating, oscillating or reciprocating perforated mixing means located in the bottom thereof forming a mixing zone, and a plurality of baffles thereabove forming a settling zone, the flow of fluids being countercurrent with respect to each other and substantially parallel to the long axis of the tower in the settling zone but perpendicular thereto within the region of the mixing.

Figure 6 is an elevational view of a section of Figure 5 taken along lines VI—VI showing the details of the flow of the light phase.

Figure 7 is an elevational view of a section of Figure 5 taken along line VII—VII showing details of the flow of the heavy phase.

Figure 8 is an elevational view of three stages of Figure 5 taken along line VIII—VIII.

Figure 11 illustrates an elevational view of an embodiment of this invention employing a perforated plate vibrating in a pool of liquid on a baffle plate provided with a weir for contacting a liquid with a gas or vapor.

Figure 12 illustrates a modification of Figure 11 in which the liquid is maintained in annular pools.

Figure 13 shows a curve illustrating the effect of agitation on extraction efficiency.

Figure 14 shows a diagram which also illustrates the effect of agitation on extraction efficiency.

Figure 1:
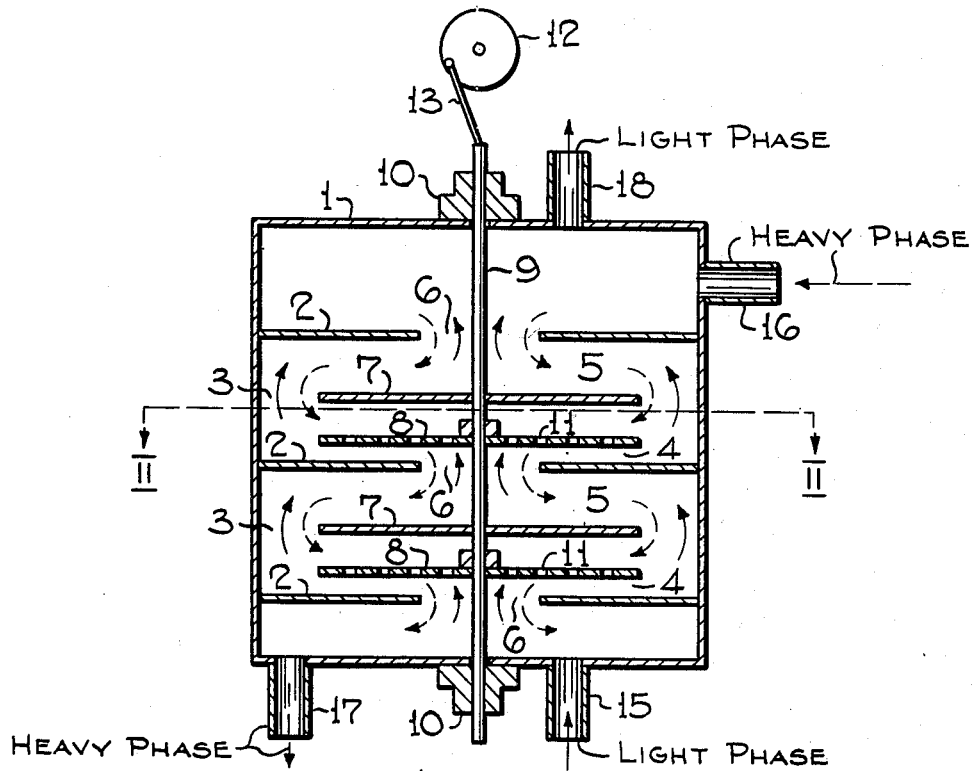
Figure 2:
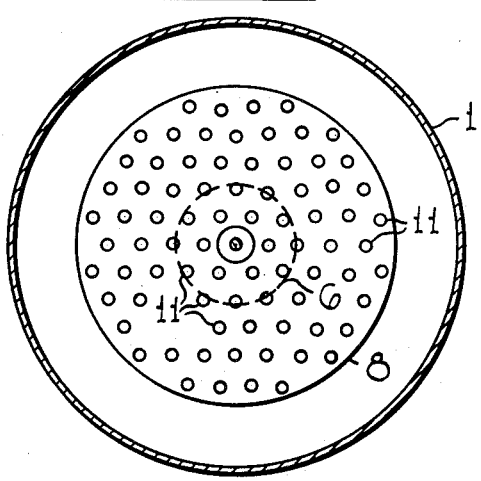
Figure 2 is a cross sectional view of Figure 1 taken along lines II—II of Figure 1.

Referring now to Figures 1 and 2, a tower 1 is provided with a plurality of section plates 2 dividing the tower into a plurality of contacting stages 3. Each stage 3 is divided into a mixing zone 4 and settling zone 5. Access is had from one stage to another by providing each section plate with central hole 6. Rigidly mounted in each settling zone are baffles 7 to provide a lengthened settling path. Each mixing zone is provided with at least one plate 8 centrally mounted on a vertically movable shaft 9, the lower end of which is positioned by any suitable guide or bearing, 10, which will permit vertical but not horizontal movement of the shaft. Suitable perforations 11 are formed in plates 8 to facilitate the mixing. Shaft 9 is connected at its upper end with eccentric drive 12 through link 13. When drive 12 is rotated (by means not shown) a vertical motion is imparted to shaft 9. The rate of oscillation of the shaft and perforated plate assembly, therefore, depends upon the rate at which the drive 12 is rotated.

Tower 1 is also provided with inlets 15 and 16 and outlets 17 and 18.

In using the tower for the countercurrent treatment of two fluids, as for example, for the solvent extraction of mineral oils, the heavier phase, e. g., a selective solvent such as phenol, is introduced through line 16 and the lighter phase, such as mineral oil, is then introduced through line 15. The light phase flows upwardly through the hole in the lowermost section plate 2 into the lowermost mixing zone 4. The drive 12 is actuated and the shaft 9 and attached perforated plates 8 are caused to reciprocate, and the liquid below and in contact with the solid portion of the plates is hit a violent blow with the result that it is forced through the holes a considerable distance and thoroughly mixed with liquid above the plate. Similarly, on the upward stroke of the perforated plate the liquid above this plate is forced into the region below the plate, with consequent mixing of the two phases flowing countercurrently. After being mixed with the heavy phase, the light phase separates in settling zone 5 between the baffles 7 and section plates 2. This phase flows along the underside of the baffles 7 and around the periphery to the center of the next above section plate 2. The descending heavy phase simultaneously flows downward in the same way and enters the mixing zone. Thus the flow of the phases, while generally countercurrent through the tower, is substantially horizontal in the mixing and settling regions. From the mixing zone the heavier phase passes down through hole 6 in the next lower section plate 2 into the next lower settling zone, or in the case of the bottom section plate, into the holdup zone at the bottom of the tower. The above described operation would be similar in any extraction process wherein the solvent is the heavier phase.

Figure 3:
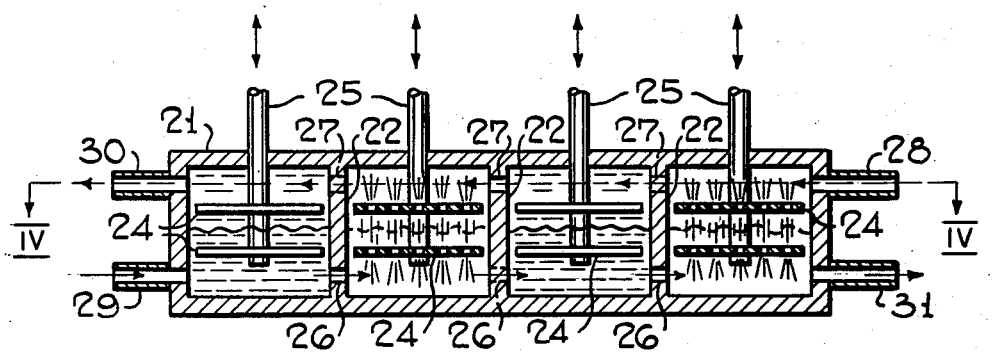
Figure 3 represents an elevational view of an embodiment of the invention in which the flow of the fluids is substantially concurrent in each stage but countercurrent through the stages, and all the stages are in the same horizontal plane.
Figure 4:
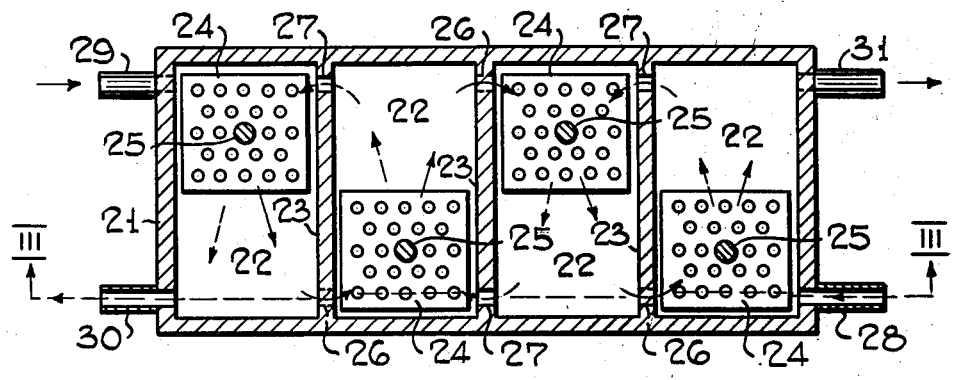
Figure 4 is a plan view of Figure 3 taken along lines IV—IV of Figure 3.

Figures 3 and 4 show an elevation and plan view of a series of four mixer-settler units arranged horizontally for concurrent flow in the individual mixer-settler units and countercurrent flow through the series of units. It is obvious that many more stages could be arranged in this same manner. The apparatus again comprises vessel 21 separated into a plurality of mixing-settling stages 22 by means of baffle walls 23. Each stage is provided with a horizontally positioned, vertically aligned, perforated plate mixer 24 attached to a vertically reciprocating shaft 25. Conduits 26 are provided in baffle walls 23 through which the heavy phase passes from the settling zone adjacent the mixing zone to the succeeding mixing zone. These conduits must be below the liquid-liquid interface and consequently near the bottom of the baffle wall 23 separating the stages. Similarly the conduits 27 are provided through which the light phase passes from a settling zone to the succeeding mixing zone. This conduit must be above the liquid-liquid interface and near the top of the wall 23 separating the stages. The interstage conduits may also take the form of U-tubes connecting the mixing and settling zones at the top for the light phase conduit and at the bottom for the heavy phase conduit. Arrangements such as these permit the phases to flow through the individual stages of the series under the influence of the gravity heads only. The light and heavy phase feeds are pumped into opposite ends of the series of stages through lines 28 and 29, respectively. The light phase is drawn off through line 30 and runs to a standpipe (not shown) and is allowed to overflow from its top, thus providing a constant pressure at the exit point for the light phase from the last stage. The heavy phase leaving the first stage through pipe 31 is run through an adjustable overflow loop (not shown) or is metered by a suitable pump (not shown) to control the position of the liquid interface in the series of stages. If it is necessary to provide additional gravity head to cause the phases to flow through the unit, the series of stages can be tipped to form an angle with the horizontal so that the stage to which the heavy phase is originally fed is somewhat higher than the stage from which the heavy phase finally leaves the apparatus.

Figures 5-8 show various views of an embodiment of the invention in which the phases flow countercurrent through the multiplicity of stages but concurrently through the individual stages. Referring now to these figures each stage is shown to consist of a mixing section 51 provided with perforated plates 52 carried by shaft 63 vibrated as in Figure 1, a settling section 53 adjacent to said mixing section 51 and formed into a horizontal U-shape by vertical baffle 54 and provided with baffles 55, and phase separating section 56 provided with light phase risers 57 and heavy phase downcomers 58, containing baffles 59 and 60, respectively. Gaskets 61 (Fig. 6) and seals 62 (Fig. 8) are provided as seals between the stages that are stacked one above the other to cause the phases to flow countercurrent through the multiplicity of stages but concurrently in each individual stage.

Figure 5:
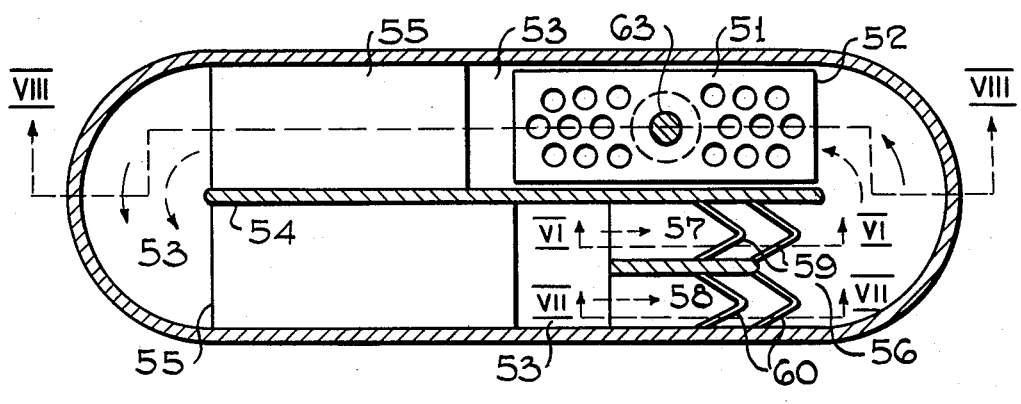
Figure 5 represents a plan view of an embodiment of the invention in which the stages are arranged vertically and in which the flow is concurrent in each stage and countercurrent through the stages.

In Figure 6 the light phase 64 is shown flowing up the light phase risers 57 between baffles 59 which prevent the heavy phase 65 from flowing down the light phase riser 57. In Figure 7 the heavy phase 65 is shown flowing down the heavy phase downcomers 58 and between another set of baffles 60 which prevent the light phase 64 from flowing up the heavy phase downcomers 58. These sets of baffles 59 and 60 are shown with a chevron shape which keeps the pressure drop low. However, the successful operation of the apparatus does not depend critically on the shape of these baffles. Straight baffles will also function very well with some reduction of the maximum throughput. By means of these interstage conduits the heavy phase is brought to a given stage from the stage positioned next above it and the light phase is brought up from the stage positioned next below it. The two phases then flow together through the mixing zone 51 in which the reciprocating perforated plates 52 subdivide the phases into small elements and thoroughly agitate them to produce a heterogeneous mixture. This mixture then flows into the settling zone 53 in which the dispersed phases are allowed to settle into distinct layers under the influence of their density difference. If the settling operation is particularly troublesome a series of settling baffles 55 may be placed in the settling zones as shown in Figure 8 to decrease the distance through which the dispersed elements must settle before striking a surface on which they can coalesce. These settling baffles 55 may be tipped to permit the material which coalesces on the settling baffles 55 to run off and rejoin the main body of its phase. The settled phases then flow to the interstage conduits 57 and 58 where the phases are separated and the light phase 64 is conducted to the stage positioned next above and the heavy phase 65 is conducted to the stage positioned next below. The center wall 54 shown in Figure 5 is used to cause the phases to flow in sequence through the mixing and settling zones before leaving the stage. The phases flow through the individual stages and through the series of stages under the influence of the gravity heads developed by the two phases, flowing concurrently along an essentially U-shaped path in each individual stage while the overall flow of the two phases through the series of stages constituting the apparatus is countercurrent and follows an essentially helical path. The light phase 64 is introduced into the bottom stage through the light phase riser 57 and the heavy phase 65 is drawn off of this stage through the heavy phase downcomer 58. Similarly, the light phase 64 is taken off the top plate through the light phase riser 57 and the heavy phase 65 is introduced at the top through the heavy phase downcomer 58.

The liquid-liquid contacting apparatus shown in Figures 5 to 8 can also be readily adapted for liquid-gas contacting with concurrent flow on the stages and countercurrent flow between stages. The mixing perforated plates for this case are designed to occupy most of the settling zones as well as the mixing zone of Figure 5. It would not be necessary to change the baffles of Figure 7, but the upper baffle of each pair in Figure 6 could be eliminated. A low weir could be installed at the top of the downcomers to maintain a shallow liquid layer on the stage.

It is important to note that the vibrating perforated plates are admirably suited for flow mixing because they offer such a low resistance to flow that the gravity heads of the phases are sufficient to permit high flow rates through the mixer-settler stages.

Figure 9:
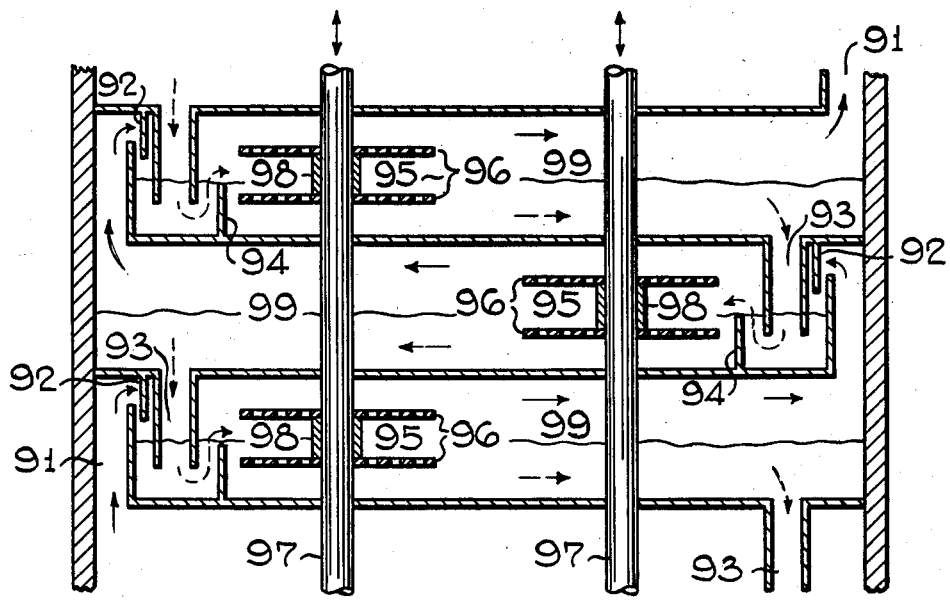
Figure 9 illustrates an alternative embodiment of the invention in elevation wherein the stages are arranged vertically and the flow is concurrent in each stage and countercurrent through the stages.

Figure 9 shows another apparatus for liquid-liquid extraction which has concurrent flow on the individual stages and countercurrent flow between stages. The light phase enters the bottom stage through the light phase riser 91 and flows around the baffle 92 forming a trap with the riser. This trap is necessary when the unit is run with each stage essentially full of heavy phase. The heavy phase enters the bottom stage from the stage positioned next above it through the heavy phase downcomer 93. A trap consisting of a baffle 94 holds a pool of heavy phase and keeps the liquid-liquid interface in the pool at a higher level than the bottom end of the heavy phase downcomer 93, thus preventing light phase from flowing up the heavy phase downcomer 93. This trap is necessary when the light phase is present in major quantity on each stage. The two phases then flow concurrently through the mixing zone 95 comprising one or more horizontally positioned, vertically aligned, vertically reciprocated perforated plates 96 attached to the reciprocating shaft 97 by means of a collar 98. After being adequately subdivided and interacted by the action of the perforated plates, the mixed phases flow into the settling zone 99 in which the phases are settled into distinct layers by the effect of their density difference. The settled light phase is then flowed into the stage positioned next above through the light phase riser 91 and around the baffle 92; the heavy phase is removed from the bottom stage through the heavy phase downcomer 93. The operation of the other stages is similar to that described for the bottom stage and the flow through the individual stages is achieved entirely from the gravity head. It is apparent that the phases follow a zigzag path through the apparatus, flowing concurrently across one stage in one direction and concurrently across the next stage in the opposite direction.

In some cases it may be desirable to use only a single stage of the type shown in Figure 9 instead of a multiplicity. This single stage would then be a continuous flow mixer and would operate as mentioned in the discussion of Figure 9.

The apparatus of Figure 9 can be readily modified for liquid-gas contacting merely by reducing the size of the settling zone, increasing the size of the perforated plate agitator, and moving the heavy phase trap baffle 94 over to a position just before the downcomer 93 through which the heavy phase leaves the stage. If this baffle maintains too deep a liquid pool in the plate, the heavy phase trap may be left as it is in Figure 9 and a low weir or dam could be placed at the top of the heavy phase downcomer 93 to maintain a shallow liquid pool on each stage. The light phase baffle 92 could be dispensed with. A single perforated plate is conveniently used as the agitator for liquid-gas contacting instead of the multiplicity of plates commonly used for liquid-liquid contacting. The oscillating perforated plates are horizontally positioned in the center of each stage near the bottom and only a single reciprocating shaft running through the center of the stages is used.

Figure 10:
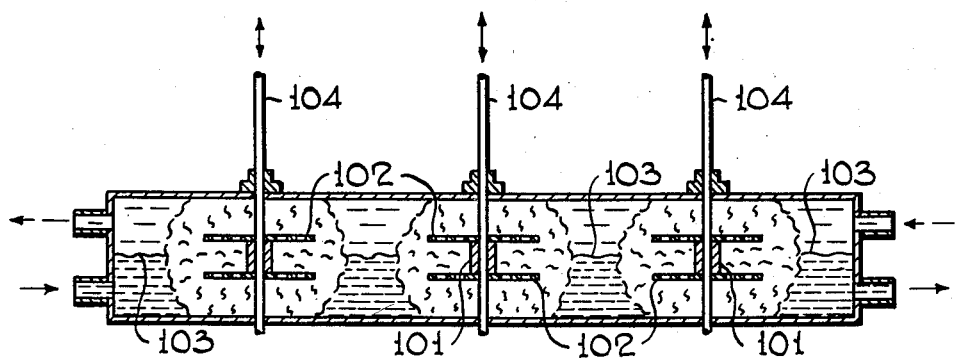
Figure 10 is an elevational view of an embodiment of the invention in which the flow is countercurrent through all parts of the individual stages as well as between the stages.

Figure 10 shows a liquid-liquid extraction unit in which the flow is countercurrent through all parts of the individual stages as well as between the stages. The interstage conduits for these units are somewhat simpler since both phases may be permitted to flow through the same interstage conduit. Thus, no baffles or traps are necessary to insure the proper flow paths through the units. Figure 10 shows three horizontally aligned countercurrent stages, each with a mixing zone 101 employing oscillating perforated plates 102 to provide the agitation. A settling zone 103 is provided on each side of each mixing zone 101. If a more compact unit is desired, the stages could be arranged as shown in Figure 3. If necessary a vertical step-wise arrangement of the stages can be made which will provide more static head or pressure for flow through the stages. This same effect can be obtained by tipping the unit so that it is inclined at an angle with the horizontal. The type of contactor shown in Figure 10 can be converted readily into a liquid-gas contactor merely by maintaining a shallow pool of liquid in the unit and using a single perforated plate as an agitator instead of the pair of plates as shown. If a step-type or inclined unit of this type is used, suitable dams are provided to maintain the liquid pools in the vicinity of the perforated plates. The height required for this dam depends on the liquid rate and upon the physical properties of the liquid. At certain liquid rates for some systems, the dam may satisfactorily be dispensed with.

As mentioned above, the oscillating perforated or orifice plates are effective in producing intimate contact between a gas and at least one liquid phase. Various types of equipment may be designed to take advantage of this method of liquid-gas contacting. Figure 11 shows a liquid-gas contactor in which a thin layer of liquid is maintained on top of baffle plates 111 and a vertically oscillating perforated plate 112 attached to a reciprocating shaft 113 in the center of the unit is positioned to be at the liquid-gas interface 114 at the top of its stroke. A liquid-tight seal is used where the reciprocating shaft passes through the baffle plates. The liquid and gas phases are flowed countercurrently through the agitating zone 115 of the perforated plate. The gas phase then flows into a short settling space 116 where the liquid entrained in the gas phase is allowed to settle out. The liquid phase overflows from the baffle plates over the small dam 117 which maintains a liquid pool on each plate. The liquid and gas phases flow countercurrently through the stages back and forth through the agitating zones where they are intimately contacted. The liquid phase cascades from plate to plate down the column and the gas phase flows up around the ends of the baffle plates. By decreasing the size of the stirrer and increasing the length of the settling zones, this apparatus can be converted for use as a liquid-liquid contactor. A multiple perforated plate stirrer is frequently more desirable in liquid-liquid extraction applications. The pressure drop of the gas phase is very low when contacted with a liquid by means of oscillating perforated plates. For this reason oscillating perforated plates are well suited for use as the gas-liquid contacting device in vacuum fractionating towers where it is desirable to keep the pressure drop very low without loss of contacting efficiency. The flow through individual gas-liquid contacting stages may be either concurrent or countercurrent. Multistage gas-liquid contacting apparatus may take the same general forms as the liquid-liquid contacting apparatus previously described. The main differences are that the liquid layer is now maintained rather shallow, the interstage conduits in some of the units are slightly modified, and the settling zones are usually quite short. In many cases it may also be desirable to use a single perforated plate as the agitating device instead of the multiple one shown for the liquid-liquid contacting devices. The liquid-liquid contacting apparatus shown in Figures 3 and 4 can be used as liquid-gas contacting stages arranged horizontally to give concurrent flow in the stages and countercurrent flow between the stages. The settling zones can be made much shorter and the perforated mixing plates correspondingly larger. The liquid conduits between stages must be liquid sealed at all times to prevent the gas from by-passing some of the stages. They may be made in the form of U-tubes connecting the bottom of one stage with the bottom of the next. The gas interstage conduits can be quite large as long as they are above the surface of the liquid. The liquid flow through the multiplicity of stages is caused by gravity head. If more head is needed than can be readily obtained with the apparatus horizontal, the entire unit may be inclined at an angle with the horizontal and thus provide more gravity head for the liquid flow. By making minor changes this apparatus can be made into a similar apparatus for countercurrent flow in the individual stages as well as through the multiplicity of stages. The main difference is that a single interstage conduit would then serve for both phases. This conduit can have about the same cross-sectional area as the contacting chambers.

Figure 12 shows a liquid-gas or vapor contacting tower in which the liquid is maintained in annular pools by a solid plate 121 across the column with a circular weir 122 in the center. The oscillating shaft 123 passes through these weirs and supports a horizontal perforated plate 124 at the liquid-gas interface 125 in each pool. This horizontal perforated plate 124 is supported at the bottom edge of a short cylinder 126 which is closed at the top and open at the bottom. The walls of the cylinder 126 are perforated to allow gas or vapor entering the cylinder from the bottom to pass out the sides just above the perforated plate 124. The cylinder diameter is sufficiently large so that the cylinder 126 fits annularly around the central weir 122 in the stationary plate 121 supporting the liquid pool. Just above the top of the cylinder and fastened to the oscillating shaft 123 is a solid plate 127 which causes the gas or vapor phase to flow across the perforated plate from the central weir to the periphery of the perforated plate. The gas or vapor then flows through the central weir 122 on the next stationary plate 121 above, through the holes 128 in the walls of the cylinder 126 supporting the perforated plate 124 and again out over the perforated plate to the periphery. The liquid overflows at the central weir 122, falls onto the reciprocating solid plate 127 where some of it is sprayed into the gas or vapor space, flows off this plate and into the peripheral portion of the liquid pool on the stationary plate 122. From there the liquid flows across and under the oscillating perforated plate 124 to the central weir 122 and again overflows. The gas or vapor is fed to the bottom of the tower and the liquid is fed to the top as in a conventional distillation or scrubbing tower.

While the forms of apparatus just described indicate the usefulness of the vibrating perforated plates as a phase contacting device, there are many ways in which slight modifications can be made to the equipment described without deviating from the principles set forth. Examples of this might be units employing spiral or circular flow paths or units in which the plane of the perforated plates and the direction of the reciprocating motion of the plates is changed.

When there is a large cross section of fluid phases to be mixed and contacted by these oscillating plates, or when the cross section of the apparatus is rectangular or of some unsymmetrical shape, several elements having oscillating mixers may be used instead of one large element. Each of the oscillating elements can be oscillated individually by separate driving mechanisms, or all of them may be attached to a single reciprocating shaft. The driving mechanisms oscillating the shaft or shafts may be of any of several well known arrangements, including electromagnetic, hydraulic, and pneumatic vibrators or oscillating devices, as well as mechanical units, such as eccentrics, combinations of levers and pivots, and gyrating machines for providing vibratory motions and oscillations.

In cylindrical or rectangular vessels where the depth of the liquid phase is about 12 inches or less and where more than one plate is needed to obtain the desired amount of mixing, the plates usually can be spaced from about 0.5 to 4 inches apart. It is also preferable that the perforations in the plates are not aligned, but staggered. When the liquid phase is several feet deep the perforated plates may be placed from about 3 to 12 inches apart.

Arrangements can be made to control the temperature in the different stages or in groups of stages. This is desirable in certain types of liquid-liquid extractions. This can be accomplished by placing heating or cooling means, such as coils or plates, in some or all of the mixing zones or settling zones. Any suitable coolant can be used. In some cases the cooling or heating fluid may be one of the phases used in the extractor. In this case minor leakage into or out of the coils or plates would not have a serious effect on the operation of the extractor or on the quality of the products from the extractor. Referring to Figures 6 and 7, a hollow or drilled plate may be inserted between the stages. A heating or cooling fluid can be circulated through this plate, which is in direct contact with the heavy phase in the stage above the plate, and the light phase in the stage just beneath the plate. Such a plate would occupy the position of gasket 61 in Figure 6, and these gaskets would then be placed on the bottom and top of this heating-cooling plate to seal it properly to the stage next above and the stage next below. This plate would be provided with suitable openings to allow the light phase to rise through it, and the heavy phase to descend through the plate.

In liquid-liquid extraction an anti-solvent is sometimes used along with the main extractive solvent to control the solubility and the selectivity of the main solvent in certain stages, or groups of stages, in the extraction unit. The present invention is particularly adapted to the use of such anti-solvents for they can be readily injected into the mixing zone of any stage or groups of stages, thereby to be quickly and intimately mixed with the main extractive solvent to produce the desired control of the main solvent's dissolving action and selectivity.

The following examples will further illustrate the invention:

EXAMPLE I

A mixture of normal heptane and methylcyclohexane saturated with aniline was pumped into the bottom of the unit described in Figure 1 and aniline saturated with these hydrocarbons was pumped into the top of this unit. The degree of mixing obtained is measured in terms of theoretical stages and fractional stages are expressed in terms of the overall Murphree efficiency (Chemical Engineering Handbook — Perry — McGraw Hill Book Co., 1941, pp. 1437). This efficiency is the ratio of the actual enrichment per stage divided by the enrichment that would be obtained if complete equilibrium between the phases was reached.

The following data show that in general, about 1.0 to 1.2 theoretical stages per actual stage were obtained, irrespective of which phase was continuous or whether one or several stages comprised the unit being tested.

*Table I*

CONTACTING EFFICIENCY TESTS ON A VIBRATED PLATE LIQUID-LIQUID EXTRACTOR (FIGURE 1)

Liquid test mixture = methylcyclohexane and normal heptane.
Solvent = Aniline.
Stage diameter = 5.5 inches.
Horizontal sectional area = 0.165 sq ft.
Height per stage = 2.4 inches.
Temperature = 24 to 26° C.

| Run Number | A | B | C | D | E | F |
|---|---|---|---|---|---|---|
| Number of Actual Mixing Sections | 1 | 1 | 1 | 1 | 3 | 3 |
| Theoretical Stages | 0.05 | 1.0 | 1.0 | 1.2 | 0.3 | 3.2 |
| Length of Stirrer Stroke, mm | 0.0 | 2.5 | 2.5 | 1.0 | 0.0 | 1.0 |
| Frequency, Strokes/min. (in one direction) | 0 | 500 | 250 | 3,600 | 0 | 3,600 |
| Solvent Feed Rate, lbs./hr | 64 | 64 | 65 | 94 | 65 | 65 |
| Hydrocarbon feed rate, lbs./hr | 10 | 10 | 9 | 13 | 10 | 10 |

From the above data it can be seen that a theoretical stage has been obtained in a height of about 2 inches. Furthermore, as shown in run C, the stage efficiency did not change appreciably when a longer stroke (2.5 mm.) was employed at considerably reduced rates of vibration (250–500 strokes per minute).

EXAMPLE II

A single-stage concurrent-flow mixer-settler unit of the type shown in Figure 9 was tested for efficiency of mixing with the liquid system water-pyridine nonanes. The distribution of pyridine between the water and oil phases was used to determine the Murphree efficiency (see Example I). The data obtained are plotted in Figure 13. The curves on Figure 13 include data obtained at amplitudes of stroke from $\frac{3}{32}$ to $\frac{3}{8}$-inch and at oscillation frequencies from 250 to 800 cycles per minute. These data have been converted to units of feet per second in the figure. The fact that data from such a range of frequencies and amplitudes correlate well in Figure 13 shows that the product of the frequency and amplitude of the oscillating motion of the plates is more important in determining the mixing characteristics than either the frequency or amplitude alone.

The different curves for the two different flow rates show that the time the flowing phases remain in the vicinity of the oscillating plates helps to determine the efficiency of mixing. For the high flow rate, and the consequent short time the phases remain in the region of activity of the mixing plates, the frequency-amplitude product required to produce 100 per cent efficiency is about double that required for the low flow rate. These curves show that Murphree stage efficiencies approaching 100 per cent are quite readily obtainable with this embodiment of the present invention. The pressure drop through the mixing and settling zones of this single stage extractor was found to be only 2 mm. of water for a flow velocity of 0.2 ft. per second with sufficient stirring to produce a mixing efficiency of about 100 per cent. The corresponding pressure drop for the flow velocity of 0.03 ft. per second and 100 per cent efficiency of mixing was about 0.1 mm. of water.

EXAMPLE III

A five-stage apparatus of the type shown in Figures 5 to 8 was tested with the same water-pyridine-nonanes liquid system used in Example II as well as with the aniline-hydrocarbon liquid system used in Example I. Stage efficiencies approaching 100 per cent were readily attainable with both systems. Figure 14 is a behavior diagram for the water-hydrocarbon system showing the region of inadequate or incomplete mixing at low frequency-amplitude products, the region of essentially 100 per cent stage efficiency at intermediate frequency-amplitude products, and the region of overmixing and entrainment at high frequency-amplitude products. The upper region of unsteady operation and flooding is determined by the hydraulic design and the dimensions of the individual stages. The data plotted in Figure 14 cover a range of frequency of vibration from 0 to 900 cycles per minute and a range of amplitude of stroke from $\frac{3}{16}$ to $\frac{5}{8}$-inch. Figure 14, therefore, further emphasizes the importance of the frequency-amplitude product in the mixing of phases with oscillating perforated plates.

EXAMPLE IV

To illustrate how fluid jets of different lengths or penetrations can be obtained with varying plate designs and degrees of oscillating motion, the data in Table II are presented.

Table II

COMPARISON OF JET LENGTHS PRODUCED BY OSCILLATING PERFORATED PLATES AT VARIOUS FREQUENCIES

Liquid system = nonanes and water.
Amplitude of stroke = 0.3-inch.
Tests at room temperature.
Hole thickness = 0.06-inch.

| Hole Diameter, inches | Ratio of Hole Area to Solid Area of Plate | Oscillation Frequency (cycles per min.) Which Produces a Jet Length of— | | | | |
|---|---|---|---|---|---|---|
| | | 0.3 inch | 1 inch | 2 inches | 3 inches | 4 inches |
| 0.25 | 0.08 | 100 | 270 | 460 | 670 | 750 |
| 0.25 | 0.18 | 180 | 420 | 600 | 780 | 990 |
| 0.25 | 0.36 | 140 | 500 | 970 | 1,360 | |
| 0.5 | 0.09 | 80 | 250 | 350 | 440 | 510 |
| 0.5 | 0.17 | 85 | 240 | 420 | 520 | 560 |
| 0.5 | 0.34 | 70 | 340 | 630 | 780 | 960 |
| 0.5 | 0.70 | 95 | 570 | 980 | 1,420 | |

These data show that there is a minimum operable frequency for each plate design below which the length of the jets are inconsequential. This minimum frequency is usually in the region of 50 to 150 cycles per minute so that those perforated plate mixers should not be operated at frequencies much below 200 cycles per minute. Table II also shows that as the ratio of the hole area to solid area increases, the frequencies of oscillating motion required to produce a given jet length also increase.

The operation as illustrated by Fig. 13 utilized a liquid system of nonanes-pyridine-water. The interface was maintained in the middle of the stage and the water to oil ratio was equivalent to 1.0. The stage height equalled 1"; the temperature was 25° C. and the mixer plates 4" long, perforated with regularly spaced holes so that the ratio of hole area to solid area was 0.4. The hole diameter equalled 0.25" and the hole thickness equalled 0.06". The operation as illustrated by Fig. 14 utilized a similar system except that the mixer plates were 7" long, perforated with regularly spaced holes so that the ratio of hole area to solid area equalled 0.3". The hole diameter was 0.5"; the hole thickness 0.06" and the stage height 2".

The nature and objects of the present invention having been thus fully set forth and specific embodiments and examples of operation given, what is claimed as new and useful and desired to be secured by Letters Patent is:

1. An apparatus for contacting at least two fluids comprising in combination a chamber adapted to contain said fluids, a first set of vertically spaced horizontally disposed fixed baffles extending from wall to wall in said chamber, said baffles having a central opening, a second set of vertically spaced horizontally disposed baffles alternating with said first set of baffles and spaced from the walls of said chamber, a vertically movable shaft centrally mounted in said chamber passing through a clearance opening in said second set of fixed baffles, perforated plates fixed to said shaft below each of said second set of baffles and above the next lower baffle of the first set, fluid inlet and outlet means in said chamber and means for imparting vertical reciprocating motion to said shaft.

2. An apparatus according to claim 1 in which the total area of the perforations in each plate are not less than 5% nor greater than 50% of the total surface area of said plate.

3. An apparatus for contacting at least two fluids comprising in combination a chamber adapted to contain said fluids, a first set of vertically spaced imperforate plates having a central opening and extending across said chamber from wall to wall defining a plurality of contacting zones in said chamber, a vertically movable shaft vertically mounted in the openings in said plates, a second set of imperforate plates attached to said shaft, at least one plate of said second set being mounted on the shaft in each contacting zone above each plate of said first set, a perforated cylinder open at its lower end centrally attached to the underside of each of said solid plates of said second set and surrounding said shaft, a perforated flange having a central opening and attached to the underside of each cylinder, the opening in said perforated flange and in said next lower solid plate of said first set forming one continuous passage, fluid inlet and outlet means in said chamber and means for imparting vertical reciprocating motion in said shaft.

4. An apparatus for contacting incompletely miscible fluids of different densities which comprises in combination a chamber adapted to contain said fluids, a plurality of vertically spaced horizontal partitions separating said chamber into a plurality of superposed treating zones, a vertical partition in said chamber spaced from the end walls thereof and dividing each of said superposed zones essentially into a mixing and a settling compartment, a common vertically movable shaft mounted in and passing through each of said mixing compartments, at least one perforated horizontal plate fixed to the shaft in each of said mixing compartments, means for imparting a vertical reciprocating motion to said shaft, a riser conduit connecting each of said settling compartments with the next higher mixing compartment and provided with a trap preventing downflow of the relatively heavy fluid through said riser conduit, a separate downcomer conduit connecting each of said settling compartments with the next lower mixing compartment and provided with a trap preventing upflow of heavy phase through said downcomer conduit, inlet means for the relatively light fluid at the bottom of the chamber and for the relatively heavy fluid at the top of the chamber, and outlet means for the relatively light fluid at the top of the chamber and for the relatively heavy fluid at the bottom of the chamber.

5. An apparatus for contacting incompletely miscible fluids of different densities which comprises in combination a chamber adapted to contain said fluids, a plurality of horizontal baffles dividing said chamber into a plurality of superposed contacting zones, two vertically movable horizontally spaced shafts vertically mounted in said chamber, a plurality of perforated transverse plates fixed to each shaft, at least one perforated plate being disposed in each contacting zone, plates in adjacent contacting zones being attached to different shafts, riser conduits connecting each of said contacting zones with the next higher contacting zone for upward passage of the relatively light fluid phase, separate downcomer conduits connecting each of said contacting zones with the next lower contacting zone for downward passage of the relatively heavy fluid phase, said riser and downcomer conduits being located at the same end in any given contacting zone and at opposite ends in adjacent zones, inlet means for the relatively light fluid at the bottom of the chamber and for the relatively heavy fluid at the top of the chamber, outlet means for the relatively light fluid at the top of the chamber and for the relatively heavy fluids at the bottom of the chamber, and means for imparting vertical reciprocating motion to said shafts.

6. An apparatus for contacting a liquid with a vapor comprising a shell having upright side walls, a plurality of imperforate horizontal liquid hold-up trays spaced above each other substantially throughout said shell, each of said trays having a free passageway located adjacent to the side wall of said shell, consecutive trays having their respective passageways alternately located adjacent to the side walls on opposite sides from each other, a plurality of plates perforated with a multiplicity of orifice-like apertures, one of said perforated plates being located above each of said hold-up trays and extending in a horizontal direction substantially only up to the respective free passageways, and means for imparting vertical reciprocating motion to said perforated plates.

7. An apparatus for contacting incompletely miscible fluids of different densities which comprises in combination a chamber adapted to contain said fluids, a plurality of vertically spaced horizontal partitions separating said chamber into a plurality of superposed treating zones, a vertical partition in said chamber spaced from the end walls thereof and dividing each of said superposed zones essentially into a mixing and a settling compartment, at least one perforated horizontal plate in each of said mixing compartments, means for imparting a vertical reciprocating motion to said perforated horizontal plates, a riser conduit connecting each of said settling compartments with the next higher mixing compartment and provided with a trap preventing downflow of the relatively heavy fluid through said riser conduit, a separate downcomer conduit connecting each of said settling compartments with the next lower mixing compartment and provided with a trap preventing upflow of heavy phase through said downcomer conduit, inlet means for the relatively light fluid at the bottom of the chamber and for the relatively heavy fluid at the top of the chamber, and outlet means for the relatively light fluid at the top of the chamber and for the relatively heavy fluid at the bottom of the chamber.

8. An apparatus for contacting incompletely miscible fluids of different densities which comprises in combination a chamber adapted to contain said fluids, a plurality of horizontal baffles dividing said chamber into a plurality of superposed contacting zones composed of a mixing region and a settling region disposed on substantially the same horizontal plane, at least one perforated transverse plate disposed in the mixing region of each contacting zone, the mixing regions in adjacent contacting zones being situated at opposite sides of said chamber, means for imparting vertical reciprocating motion to said perforated plates, riser conduits connecting each of said settling regions with the next higher mixing region for upward passage of the relatively light fluid phase, separate downcomer conduits connecting each of said settling regions with the next lower mixing region for downward passage of the relatively heavy fluid phase, said riser and downcomer conduits being located at the same end in any given contacting zone and at opposite ends in adjacent zones, inlet means for the relatively light fluid at the bottom of the chamber and for the relatively heavy fluid at the top of the chamber, and outlet means for the relatively light fluid at the top of the chamber and for the relatively heavy fluids at the bottom of the chamber.

9. A process for contacting a comparatively heavy fluid with a comparatively light fluid incompletely miscible therewith which comprises flowing the comparatively light fluid upwardly and the comparatively heavy fluid downwardly through a plurality of vertically superposed stages, each of said stages having a mixing zone and a settling zone disposed on substantially the same stationary horizontal plane, confining said fluids in each mixing zone in a small unit volume against substantial movement in all directions except lateral and subjecting said confined fluids in each mixing zone to a vertically directed pounding action applied at horizontally spaced portions of the fluids to impart rapidly recurring disruptive shocks thereto and to form an intimate mixture of said fluids, passing the resulting mixture from each mixing zone laterally to the adjacent settling zone, effecting separation of said mixture into two supernatant phases, flowing the separated upper phase to the mixing zone in the next higher stage, flowing the separated lower phase to the mixing zone in the next lower stage, withdrawing treated light fluid from the uppermost settling zone and withdrawing treated heavy fluid from the lowermost settling zone.

10. A process according to claim 9 wherein the fluids are passed through the plurality of stages along a zigzag path, flowing in one direction across one stage and in the opposite direction across the next stage.

11. A process for contacting a comparatively heavy liquid with a comparatively light liquid incompletely miscible therewith which comprises flowing the comparatively light liquid upwardly and the comparatively heavy liquid downwardly through a plurality of vertically superposed stages, each of said stages having a mixing zone and a settling zone disposed on substantially the same stationary horizontal plane, confining said liquids in each mixing zone in a small unit volume against substantial movement in all directions except lateral and subjecting said confined liquids in each mixing zone to a vertically directed pounding action applied at horizontally spaced portions of the liquids to impart rapidly recurring disruptive shocks thereto so as to thoroughly mix the liquids one with the other, passing the resulting mixture from each mixing zone laterally along a U-shaped path to the adjacent settling zone, effecting separation of said mixture into two supernatant phases, flowing the separated upper phase to the mixing zone in the next higher stage, flowing the separated lower phase to the mixing zone in the next lower stage, withdrawing treated light liquid from the uppermost settling zone and withdrawing treated heavy liquid from the lowermost settling zone.

MERRELL R. FENSKE.
ROBERT B. LONG.

References Cited in the file of this patent

UNITED STATES PATENTS

| Number | Name | Date |
|---|---|---|
| 541,658 | Crook | June 25, 1895 |
| 1,098,594 | Sieburg | June 2, 1914 |
| 1,320,396 | Laird | Nov. 4, 1919 |
| 2,011,186 | Van Dijck | Aug. 13, 1935 |
| 2,106,366 | Tijmstra | Jan. 25, 1938 |
| 2,150,608 | Olier | Mar. 14, 1939 |
| 2,223,348 | Boedeker | Dec. 3, 1940 |